(12) United States Patent
Nakagawa

(10) Patent No.: US 11,881,811 B2
(45) Date of Patent: Jan. 23, 2024

(54) DEPLOYABLE STRUCTURE

(71) Applicant: Leala Nakagawa, Nashville, TN (US)

(72) Inventor: Leala Nakagawa, Nashville, TN (US)

( * ) Notice: Subject to any disclaimer, the term of this patent is extended or adjusted under 35 U.S.C. 154(b) by 0 days.

(21) Appl. No.: 17/904,768

(22) PCT Filed: Mar. 7, 2022

(86) PCT No.: PCT/IB2022/052005
§ 371 (c)(1),
(2) Date: Aug. 22, 2022

(87) PCT Pub. No.: WO2022/195400
PCT Pub. Date: Sep. 22, 2022

(65) Prior Publication Data
US 2023/0216443 A1    Jul. 6, 2023

Related U.S. Application Data

(60) Provisional application No. 63/160,798, filed on Mar. 13, 2021.

(51) Int. Cl.
*H02S 30/20* (2014.01)
*H02S 20/10* (2014.01)

(52) U.S. Cl.
CPC ............... *H02S 30/20* (2014.12); *H02S 20/10* (2014.12)

(58) Field of Classification Search
CPC ....................................................... H02S 30/20
See application file for complete search history.

(56) References Cited

U.S. PATENT DOCUMENTS 8,384,613 B1    2/2013    Murphey et al.
8,807,417 B2    8/2014    Valesini Gegembauer
(Continued)

FOREIGN PATENT DOCUMENTS

CN    105915169 B    5/2017
CN    207283488 U  *  4/2018
(Continued)

OTHER PUBLICATIONS

Chen et al., "Autonomous Deployment of a Solar Panel Using Elastic Origami and Distributed Shape-Memory-Polymer Actuators", Physical Review Applied 11, 2019, All pages. (Year: 2019).*
(Continued)

*Primary Examiner* — Daniel P Malley, Jr.
(74) *Attorney, Agent, or Firm* — iPA & iPM

(57) ABSTRACT

A deployable/retractable structure, or a template thereof, is disclosed. The structure comprises a plurality of pleating folds among peaks and valleys, which extend away, retract towards, and/or rotate around a central hub. The folds, with extended continuous planar surfaces, can be configured to host objects, such as solar arrays. In a retracted configuration, solar arrays are protected and folded away, taking up much less space. Electricity generated via the arrays is coupled with signals to instruct the structure to transition among stages of retractions and/or deployments. This structural design enables the solar arrays to be positioned in many angles and facets, which makes it an overall non-flat unit, less dependent on the directions of sunlight. A smaller scaled down unit can be light, portable, and operated by hand. A larger scaled up unit can be stationed on the ground or atop existing charging stations, which affords easier access and maintenance.

12 Claims, 14 Drawing Sheets

(56) References Cited

U.S. PATENT DOCUMENTS

| | | | |
|---|---|---|---|
| 10,658,741 | B1 | 5/2020 | Zekios et al. |
| 10,734,941 | B2 | 8/2020 | Jeon et al. |
| 10,955,097 | B2 | 3/2021 | Sreshta et al. |
| 2005/0267616 | A1 | 12/2005 | Jensen et al. |
| 2008/0223431 | A1 | 9/2008 | Chu |
| 2014/0230882 | A1 | 8/2014 | Hingley |
| 2017/0021947 | A1* | 1/2017 | Pellegrino ............... H02S 10/40 |
| 2021/0194420 | A1 | 6/2021 | Magleby et al. |

FOREIGN PATENT DOCUMENTS

| | | | | |
|---|---|---|---|---|
| DE | 20201800394 | U1 | 5/2018 | |
| DE | 202018000394 | U1 * | 5/2018 | ............. H02J 7/355 |
| FR | 2942351 | A1 * | 8/2010 | ............. H02S 30/20 |
| WO | WO2019236834 | A1 | 12/2019 | |

OTHER PUBLICATIONS

English machine translation of Morph Green Tech (DE-202018000394-U1) provided by the EPO website, 2023, All Pages. (Year: 2023).*

English machine translation of Ethuin (FR 2942351 A1) provided by the EPO website, 2023, All Pages. (Year: 2023).*

English machine translation of Zhang (CN 207283488 U) provided by the EPO website, 2023, All Pages. (Year: 2023).*

Chen et al., "autonomous Deployment of a Solar Panel Using Elastic Origami and Distributed Shape-Memory-Polymer Actuators", Physical Review Applied, 11, All Pages, 2019. (Year: 2019).*

Victor Parque et al: "Packaging of Thick Membranes using a Multi-Spiral Folding Approach: Flat and Curved Surfaces" ARXIV. org, Cornel University Library, 201 Olin Library Cornell University Ithaca, NY 14853, Dec. 8, 2020, XP081833953, DOI: 10.1016/J. ASR.2020.09.040.

Tian Chen et al: "Autonomous Deployment of a Solar Panel Using an Elastic Origami and Distrubuted Shape Memory Polymer Actuators", ARXIV.org, Cornell University Library, 201 Olin Library Cornell University Ithaca, NY 14853, Oct. 21, 2018, XP081386042, DOI: 10.1103/PHYSREVAPPLIED.11.064069.

Zirbel Shannon A et al: "HanaFlex: a large solar array for space applications". Proceedings of Spie, IEEE, US, vol. 9467, May 22, 2015, pP. 94671C-94671C, XP060054832, Doi: 10.1117/12. 2177730, ISBN: 978-1-62841-730-2.

* cited by examiner

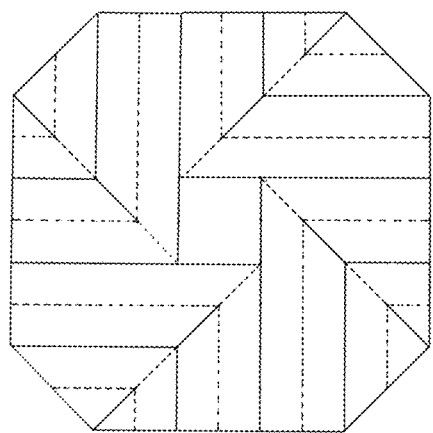
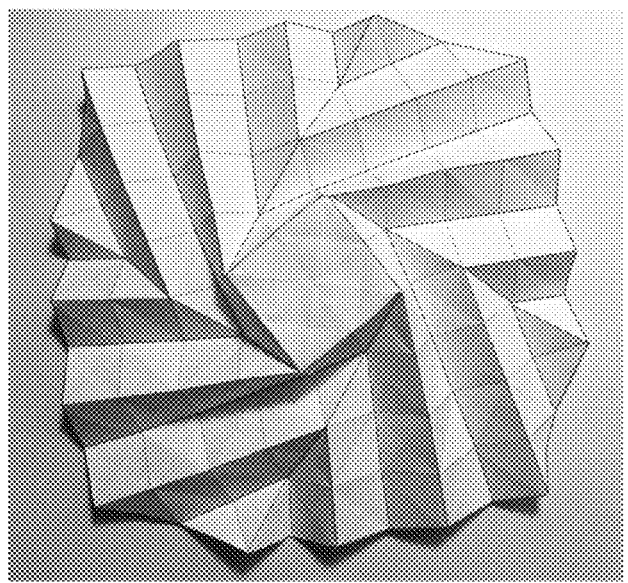
Fig. 14d  Fig. 14e
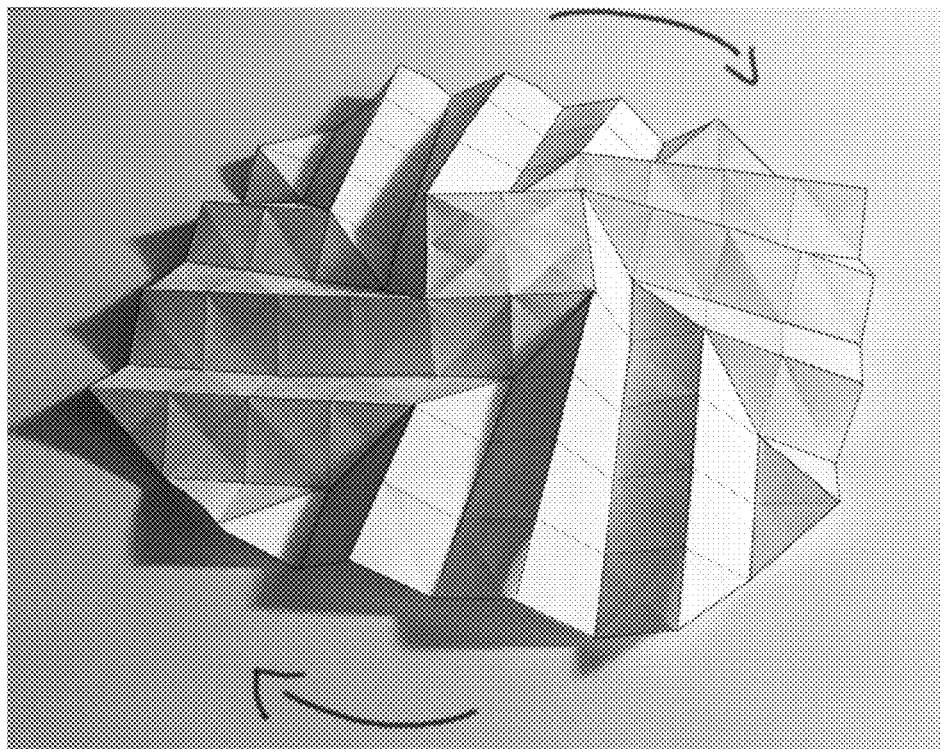
Fig. 14f

DEPLOYABLE STRUCTURE

CROSS-REFERENCES TO RELATED APPLICATIONS

This Application claims priority to an U.S. Provisional Application No. 63/160,798, filed on Mar. 13, 2021, which is hereby incorporated herein by reference in its entirety. A U.S. Design Patent Applications No. 29/774,067 was filed on Mar. 13, 2021, with an outside view of one of the embodiments among the present disclosure. The design application is currently pending examination at the USPTO, and has not been published as of the filing date of the present PCT utility application.

TECHNICAL FIELD

The present disclosure, in some embodiments thereof, relates to a deployable and/or retractable structure with adjustable configurations, which serves as a template for hosting objects such as solar arrays.

BACKGROUND OF DISCLOSURE

Solar arrays take up a lot of space due to its need to maximize surface exposure to a source of radiation, such as the sun. Solar farms with lots of panels are often housed in rural area. Residential flat panels are often bolted on rooftops, in a bid to keep them from occupying too much living space on the ground. The present disclosure provides a deployable and/or retractable structure as a template to host objects, such as solar arrays in various configurations at will.

In a fully deployed configuration, solar arrays' exposure to the sun is maximized. In a fully retracted and compact configuration, panels of the solar arrays are fully protected, and occupy much less space. Transition among intermediary deployed/retracted configurations provides a mechanism to continuously monitor and to attenuate electricity output by adjusting the solar array's area of surface exposure to the sun accordingly. The structure allows solar arrays to be placed with multiple facets and orientations all around, and thus reduces fluctuation of electric output due to relative movements between the arrays and the sun.

This deployable structure, as a whole unit, can be scaled up or scaled down as needed. A smaller unit can thus be portable for purpose of charging smaller devices at locations of one's choice. A larger unit can be stationed by itself or in clusters to provide for devices with higher electricity demands.

BRIEF SUMMARY OF EMBODIMENTS

In a variant, a deployable structure comprises a central hub with a polygonal top surface; a leading region and a trailing region are configured around each vertex of the polygonal top surface, wherein the leading region comprises a first set of parallel folds intersecting at a preset angle with a corresponding second set of parallel folds in the trailing region. The deployable structure transforms in stages between a fully retracted configuration and a deployed configuration. In the fully retracted configuration, all folds collapse onto one another, and further onto side surfaces of the central hub, excess folds extending over one side of the central hub collapse onto an adjacent side. In the deployed configuration, all folds extend outward away from the central hub, and away from one another.

In another variant, the first and the second set of parallel folds are connected at their intersections, and correspond to a plurality of generally continuous planar surfaces alternating between peaks and valleys in succession.

In yet another variant, the first set of parallel folds in the leading region are parallel to a first side of the polygonal top surface around its corresponding vertex, and the second set of parallel folds in the trailing region are parallel to a subsequent side of the polygonal top surface around said vertex.

In still another variant, the first and second set of parallel folds in the leading and trailing regions comprise a preset width and number.

In another variant, the first and second set of parallel folds in the leading and trailing regions around one vertex is connected to those around a subsequent vertex of the top polygonal surface.

In yet another variant, the first and second set of parallel folds in the leading and trailing regions around one vertex is configured to be independent from those around other vertices of the top polygonal surface.

In still another variant, the transformation stages among a retracted and a deployed configuration are driven via translational forces generally along the radius of the central hub, or via centrifugal forces around a center of the central hub, and/or a combination thereof.

In further a variant, at least a subset of a plurality of parallel folds comprise a composite material.

In a variant, a deployable structure for solar arrays comprising a deployable structure, which comprises a central hub with a polygonal top surface; a leading region and a trailing region are configured around each vertex of the polygonal top surface, wherein the leading region comprises a first set of parallel folds intersecting at a preset angle with a corresponding second set of parallel folds in the trailing region. The first and the second set of parallel folds correspond to a plurality of generally continuous planar surfaces alternating between peaks and valleys in succession. A plurality of solar arrays are detachably coupled to the polygonal top surface, and atop the planar surfaces of the first and second set of parallel folds; The deployable structure for solar arrays transforms in stages between a fully retracted configuration and a deployed configuration. In the fully retracted configuration, all folds collapse onto one another, and further onto side surfaces of the central hub, excess folds extending over one side of the central hub collapse onto an adjacent side. In the deployed configuration, all folds extend outward away from the central hub, and away from one another.

In a variant, the solar arrays comprise a plurality of photovoltaic cells tailored to be detachably coupled with the deployable structure at strategically preset locations along the planar surfaces of the parallel folds.

In another variant, the central hub further houses series of wiring and charging components within its cavity.

In further a variant, the parallel folds and the central hub are reinforced via a plurality of auxiliary support elements, affixed to a support stand, and/or atop a charging station.

In yet another variant, solar arrays comprise a plurality of attachment mechanisms configured to detachably couple with the deployable structure.

In still another variant, the deployable structure comprises a plurality of attachment mechanisms configured to detachably couple with the solar arrays.

In a variant, electricity generated via the solar arrays is converted into signals to instruct the deployable structure to transform in stages between a fully retracted configuration and a plurality of deployed configurations.

In another variant, detachable coupling means comprises hooks and loops, carabineers, clips, R-clips, spring clips, rings, pins, clevis pins, cotter pins, linchpins, buttons, buckles, grommets, adhesives, Velcro, and snap fastener with male/female part.

In another variant, the solar arrays are coupled to corresponding peak and valley folds in a complimentary manner.

A method for transforming a deployable structure comprising: applying translational forces and/or rotational forces to drive the deployable structure in stages between a fully retracted configuration and a deployed configuration. The deployable structure comprises a central hub with a polygonal top surface; a leading region and a trailing region are configured around each vertex of the polygonal top surface, wherein the leading region comprises a first set of parallel folds intersecting at a preset angle with a corresponding second set of parallel folds in the trailing region. In the fully retracted configuration, all folds collapse onto one another, and further onto side surfaces of the central hub, excess folds extending over one side of the central hub collapse onto an adjacent side. In the deployed configuration, all folds extend outward away from the central hub, and away from one another.

A method for transforming a deployable structure for solar arrays comprising: applying translational forces and/or rotational forces to drive the deployable structure for solar arrays in stages between a fully retracted configuration and a deployed configuration. The deployable structure for solar arrays comprises a central hub with a polygonal top surface; a leading region and a trailing region are configured around each vertex of the polygonal top surface, wherein the leading region comprises a first set of parallel folds intersecting at a preset angle with a corresponding second set of parallel folds in the trailing region; the first and the second set of parallel folds correspond to a plurality of generally continuous planar surfaces alternating between peaks and valleys in succession. A plurality of solar arrays are detachably coupled to the polygonal top surface, and atop the planar surfaces of the first and second set of parallel folds at preset locations. In the fully retracted configuration, all folds collapse onto one another, and further onto side surfaces of the central hub, excess folds extending over one side of the central hub collapse onto an adjacent side. In the deployed configuration, all folds extend outward away from the central hub, and away from one another.

Other features and aspects of the disclosure will become apparent from the following detailed description, taken in conjunction with the accompanying drawings, which illustrate, by way of example, the features in accordance with embodiments of the disclosure. The summary is not intended to limit the scope of the disclosure, which is defined solely by the claims attached hereto. Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiment of the disclosure, exemplary methods and/or materials are described below. In case of conflict, the patent specification, including definitions, will control. In addition, the materials, methods, and examples are illustrative only and are not intended to be necessarily limiting.

DESCRIPTION OF DRAWINGS

The present disclosure, in accordance with one or more various embodiments, is described in detail with reference to the following figures. The drawings are provided for purposes of illustration only and to merely depict typical or example embodiments of the disclosure. These drawings are provided to facilitate the reader's understanding of the disclosure and shall not be considered limiting of the breadth, scope, or applicability of the disclosure. It should be noted that for clarity and ease of illustration these drawings are not necessarily made to scale. Some of the figures included herein illustrate various embodiments of the disclosure from different viewing angles. Although the accompanying descriptive text may refer to such views as "top," "bottom" or "side" views, such references are merely descriptive and do not imply or require that the disclosure be implemented or used in a particular spatial orientation unless explicitly stated otherwise.

FIG. 14d is a mirror image of FIG. 14a.

FIG. 14e is a top view of a 3D structure, based on the 2D crease map in FIG. 14d, in an intermediary stage of deployment.

FIG. 14f is a perspective view of FIG. 14e.

The figures are not intended to be exhaustive or to limit the disclosure to the precise form disclosed. It should be understood that the disclosure can be practiced with modification and alteration, and that the disclosure be limited only by the claims and the equivalents thereof.

DETAILED DESCRIPTION OF EMBODIMENTS OF DISCLOSURE

The description and/or disclosure that follow comprise illustrative systems, methods, techniques, sequence instructions, and computing machine program products that embody illustrative embodiments. In the following description, for purpose of explanation, numerous specific details are set forth in order to provide an understanding of various embodiments of the inventive subject matter. From time-to-time, the present disclosure is described herein in terms of example environments. Description in terms of these environments is provided to allow the various features and of the disclosure to be portrayed in the context of an exemplary application. It will be evident, however, to one of ordinary skill in the art how the disclosure can be implemented in different and in alternative environments, with or without specific details. In general, well-known instruction instances, protocols, structures, and techniques have not been shown in great detail. Unless defined otherwise, all technical and scientific terms used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present disclosure, in some embodiments thereof, relates to a deployable/retractable structure or structural template for hosting objects such as solar panels or solar arrays. The structure comprises a central hub and serials of valley and hill folds surrounding the hub. The folds can be configured to rotate around the central hub as they extend away or retract toward the central hub simultaneously. Solar arrays hosted on the structure are exposed to sunlight or radiation 360 degrees around the central hub, when the structure is in various deployed positions. Those panels are fully protected around the hub when the structure is in a completely retracted position.

For purpose of demonstration, FIGS. 1-13 illustrate an embodiment with a triangular central hub, which is one of the simplest polygons with only three edges along its top surface. FIGS. 14-18 illustrate polygons with more edges, complicated shapes, sizes, and configurations.

Figure 13A:
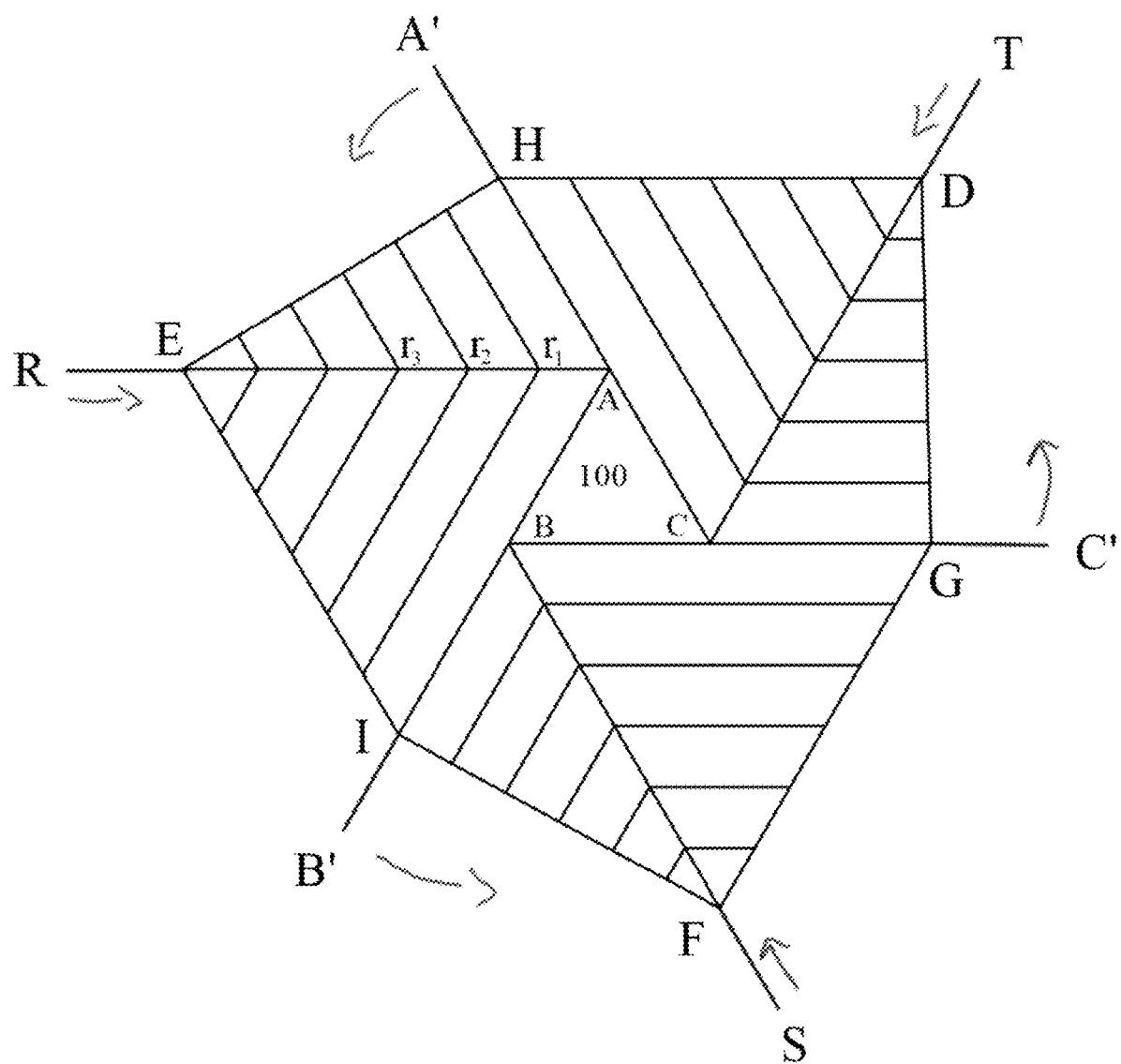
FIG. 13a is a top view of a two-dimensional (2D) crease map for the deployable structure, with a triangular central hub, in a completely opened and flattened position.

FIG. 13a is a two-dimensional (2D) crease map of a deployable/retractable structure, or a template of the structure, which coincides with its top surface, when it is in a fully deployed stage. A triangle 100 with vertices A, B, and C defines a two-dimensional surface area atop a central hub. Edges of the triangle 100 are extended outward in a straight line and in a counter clockwise manner. Edge $\overrightarrow{AB}$ is extended to B' (an imaginary point along its extension for illustration purpose only), edge $\overrightarrow{BC}$ is extended to C', and edge $\overrightarrow{CA}$ is extended to A' respectively. Line $\overrightarrow{AR}$ divides ∠A'AB', line $\overrightarrow{BS}$ divides ∠B'BC', and line $\overrightarrow{CT}$ divides ∠C'CA'. Area A'AR is referred to as a leading region around vertex A. A first group of parallel lines are configured with a preset spacing, and are parallel to edge $\overrightarrow{CAA'}$ in the leading region. Area RAB' is referred to as a trailing region around vertex A. A second group of parallel lines are configured with a preset spacing, and are parallel to edge $\overrightarrow{ABB'}$ in the trailing region. Parallel lines in both leading and trailing regions meet and share termination points along dividing line$\overrightarrow{AR}$, which are marked as r1, r2, . . . E. Parallel lines in both leading and trailing regions mark the peaks and valleys of folds in sequence, similar to those in a set of fabric pleats or in an accordion. They correspond to a plurality of generally continuous planar surfaces alternating between peaks and valleys in succession. Shared termination points ensure that two intersecting parallel lines in both leading and trailing regions correspond to one another. In other words, a peak in a leading region is also a peak in the trailing region by virtue of its connection at its corresponding termination point along the dividing line$\overrightarrow{AR}$, and vice versa for a valley.

In a repeatable manner, area B'BS is designated as a leading region around vertex B. Area SBC' is designated as a trailing region around vertex B. Area C'CT is designated as a leading region around vertex C. Area TCA' is designated as a trailing region around vertex C. Parallel lines for peaks and valleys are configured accordingly in each of these regions.

Figure 17:
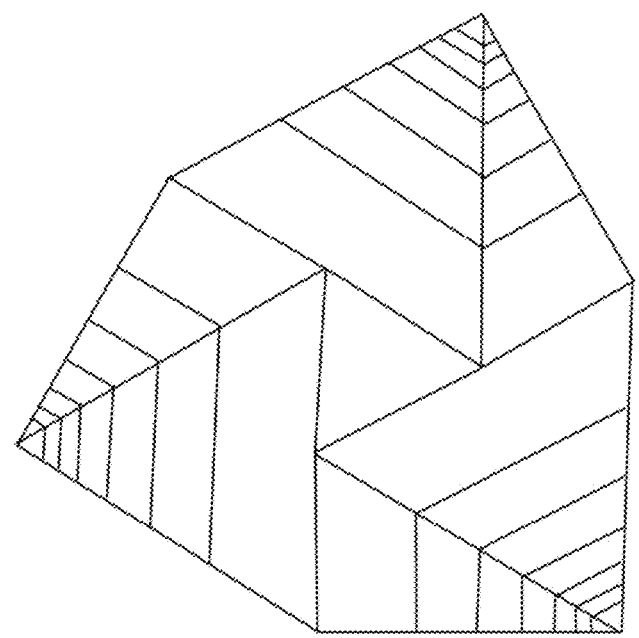
FIG. 17 is a 2D crease map of a deployable structure with a triangular central hub and decreasing width of folds.
Figure 18:
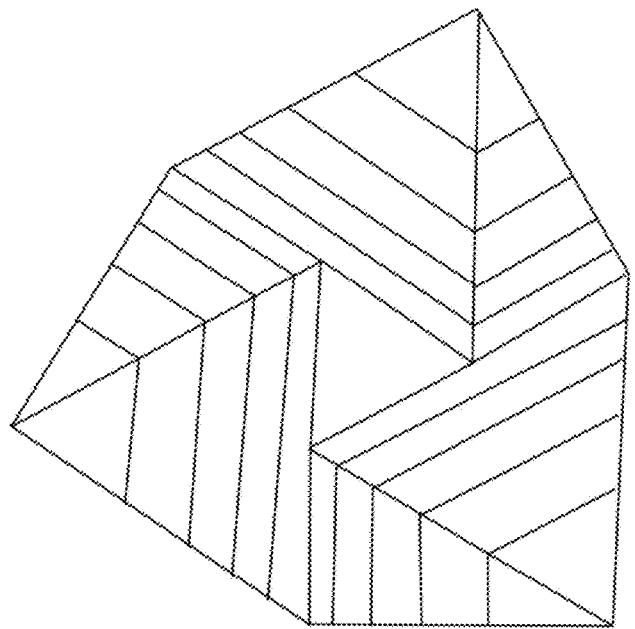
FIG. 18 is a 2D crease map of a deployable structure with a triangular central hub and increasing width of folds.

Points H, E, I, F, G, and D are labeled to arbitrarily set an end point along each corresponding line. By connecting these points, therefore, one can demarcate an exemplary boundary or outline of the top surface of the deployable structure in a fully deployed stage. Width of the folds, or distance between two parallel lines, can certainly vary (as shown in FIGS. 17 and 18). Number of folds can also vary based on need. FIG. 13a should not be construed as limiting in terms of its dimensions of the folds and its boundary with respect to a triangular central hub (or any shaped central hub).

Enlarged views of the deployable structure at various stages are illustrated in FIGS. 1-11. FIG. 12 illustrates three-dimensional (3D) transitional stages of a structure (or a template thereof) with a triangular central hub as shown in FIG. 13a. Vertices from A-I are labeled on each of them to help visualize how the structure transform back and forth between a fully retracted stage and a mostly deployed one.

Retraction via rotation (or centrifugal force), counter clockwise around vertices A, B, and C, can be initiated from the base of a leading region (edges$\overrightarrow{AH}$, $\overrightarrow{BI}$, and $\overrightarrow{CG}$), or from the rotation of the central hub itself. Counter clockwise rotational forces alone can initiate and drive a retraction process in its entirety due to the connectivity of this design. Rotational forces initiated simultaneously at A', B', and C' (or at H, I and G) will improve the speed of motion and efficiency. Rotational forces clockwise will reverse the transformation and return the structure back into various stages of deployment.

Retraction via translational forces can be initiated by directly pushing vertices E, F, and D (individually or simultaneously) towards the central hub roughly along their corresponding dividing lines $\overrightarrow{EA}$, $\overrightarrow{FB}$, and $\overrightarrow{DC}$. The collapsing of folds initiated at vertices E, F, and D will, in turn, facilitate a counter clockwise rotation of the leading and trailing regions. A translational force, applied in an opposite direction pulling away from the central hub, will reverse the transformation and return the structure back into various stages of deployment.

Rotational and translational mechanisms described above can certainly be combined to drive the transform process of the structure, or a template thereof. FIG. 13a illustrates an example where both mechanisms are linked by design. As the retraction of the structure progresses, peaks and valleys in immediate vicinities move towards the central hub and collapse onto one another in succession. By virtue of connection, folds in the leading regions drive corresponding folds in the trailing region in a similar fashion towards the central hub. Excess folds that extend beyond a vertex simply wrap around the vertex and collapse onto an adjacent side of the central hub. In a fully retracted stage, as illustrated in the top figure in FIGS. 12, 8a and b, and 16c, all folds collapse onto one another and tightly wrap around the central hub. In a deployment process, opposite movements take place, with peaks and valleys moving away from the central hub and peeling away from one another in succession. In a fully deployed stage, the top surface can be as flat as the 2D crease map in FIG. 13a. Intermediate stages are illustrated in FIG. 12 in both directions.

Figure 13B:
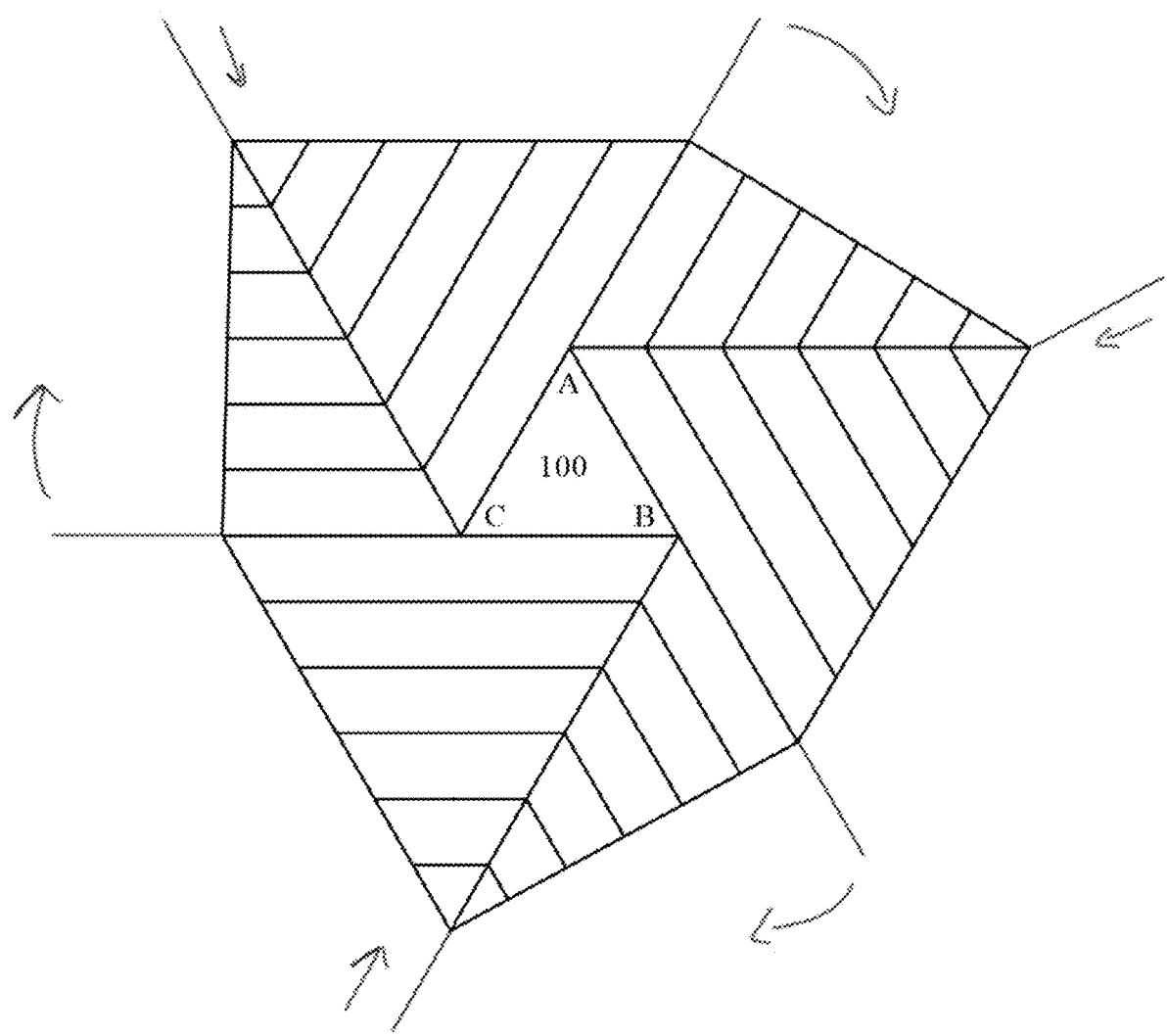
FIG. 13b is a mirror image of FIG. 13

A mirror image of FIG. 13a is illustrated in FIG. 13b, which will result into a crease map that corresponds to a structure that rotates clockwise during retraction.

In FIGS. 13a and 13b, a leading region around a vertex, for instance A, is connected to a trailing region around the same vertex A along line $\overrightarrow{AR}$. The trailing region around vertex A is in turn connected to the leading region around the subsequent vertex B, along a shared boundary line $\overrightarrow{BB'}$. This connection pattern repeats itself, so on and so forth, propagating from one vertex to the next, and all the way back to the first vertex A. For a simple triangle 100, leading and trailing regions around vertex A are connected to those around subsequent vertices B then C, and then back to A.

By connecting leading and trailing regions from one vertex to the next along shared boundary lines, one can improve the speed of motion and efficiency of transformation. Rotational (or centrifugal) and/or translational forces applied to a few locations can drive the entire structure back and forth. A foreseeable flipside is that a glitch at a single location can prevent and hinder the entire structure's transformation process.

An alternative configuration is to make leading and trailing region around a same vertex independent from those around neighboring vertices. In FIG. 13a, for instance, a trailing region RAB' around vertex A can be configured to disjoin with a leading region B'BF around vertex B. Leading and trailing region around one vertex can thus retract or deploy independently from other regions around other vertices. Whether they share a boundary line $\overrightarrow{BB'}$ is no longer essential or limiting in this type of configurations. Peak and Valley folds in the leading and trailing regions are also not required to be parallel to respective sides of the top polygonal surface.

Figure 14A:
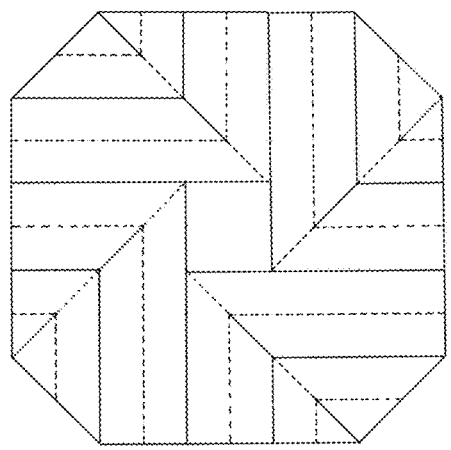
FIG. 14a is an exemplary 2D crease map of a deployable structure with a square shaped central hub.
Figure 14B:
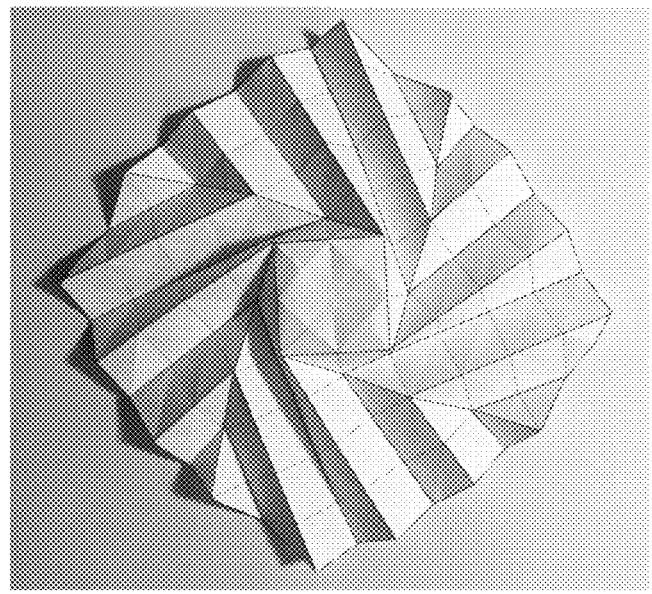
FIG. 14b is a top view of a three-dimensional (3D) structure, based on the 2D crease map in FIG. 14a, in an intermediary stage of deployment.
Figure 14C:
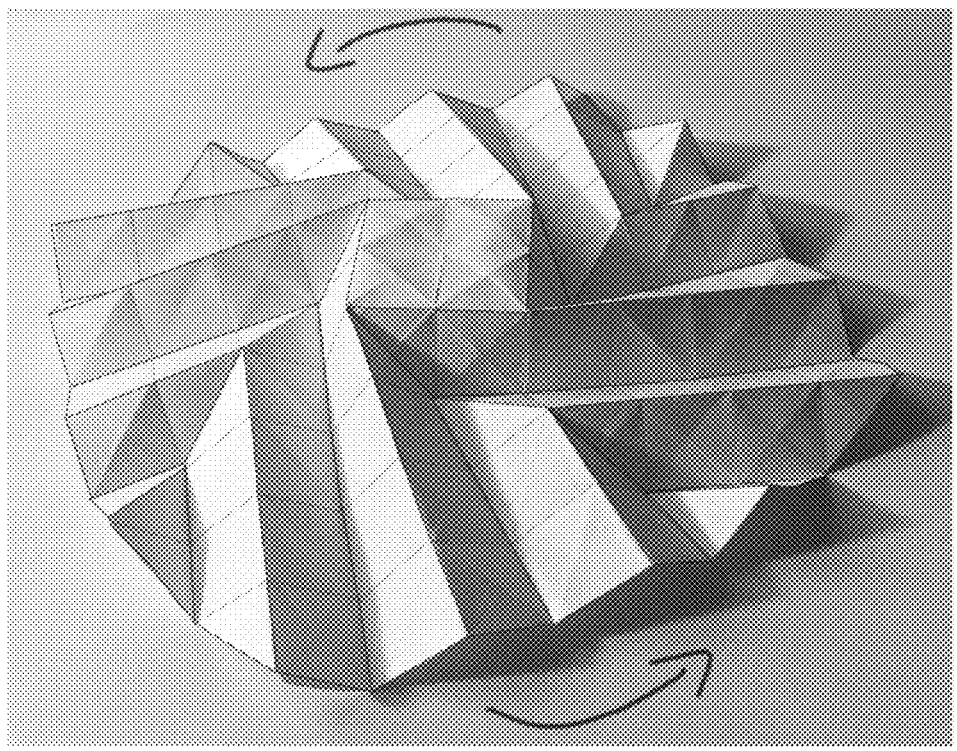
FIG. 14c is a perspective view of FIG. 14b

The central hub of the structure does not need to be triangular. FIG. 14a illustrates an exemplary 2D crease map with a square central hub. A top and a perspective view of an intermediary stage of a deployed 3D structure based on FIG. 14a are shown in FIGS. 14b and 14c (counter clockwise rotation). FIG. 14d is a 2D crease map of a mirror image of FIG. 14a, with its corresponding intermediary stage of a deployed 3D structure shown in FIGS. 14e and 14f (clockwise rotation in a top view and a perspective view).

Figure 15:
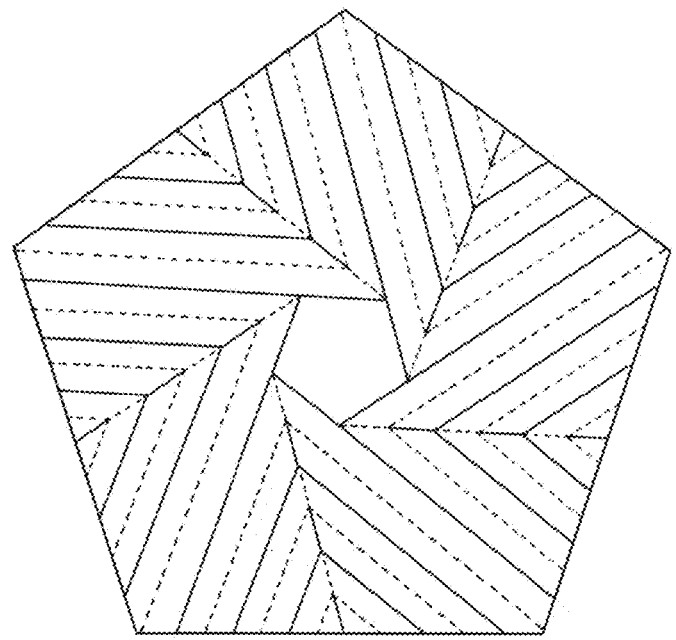
FIG. 15 is an exemplary 2D crease map of a deployable structure with a pentagon shaped central hub.
Figure 16A:
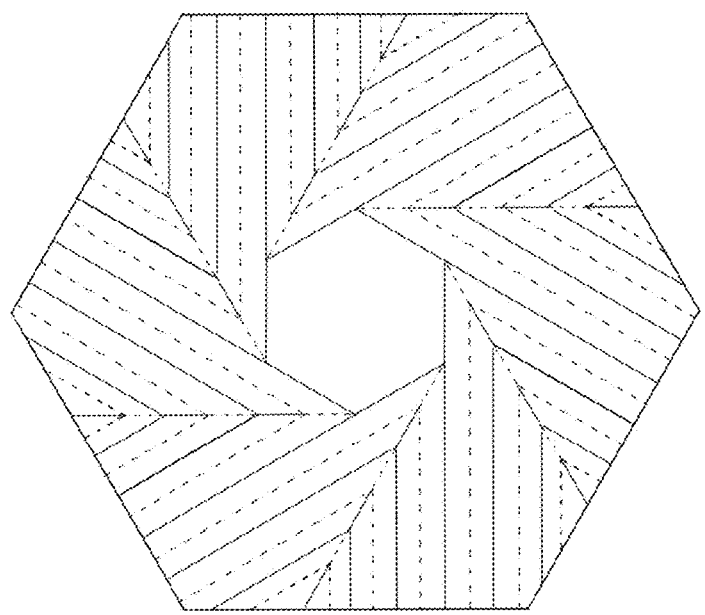
FIG. 16a is an exemplary 2D crease map of a deployable structure with a hexagon shaped central hub.

FIGS. 15 and 16a illustrate crease maps of central hubs as pentagon and hexagon. The outer boundaries are shown respectively as a pentagon and a hexagon for illustrative purpose only. The outer boundary does not need to be in identical shape as the central hub. FIGS. 13a-b, 14a and 14d illustrate several central hubs as either a triangle or as a cube, with their outmost boundary of corresponding 2D crease map configured into very different polygons.

Figure 16B:
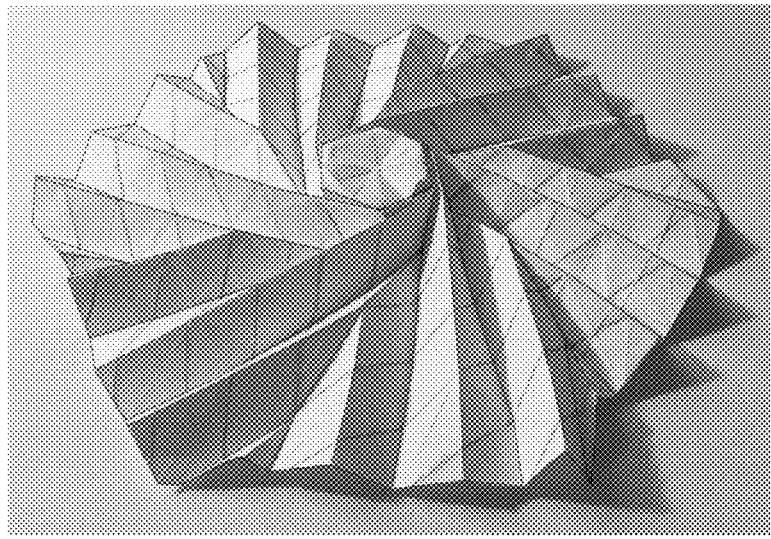
FIG. 16b is a perspective view of a 3D structure, based on the 2D crease map in FIG. 16a, in an intermediary stage of deployment.
Figure 16C:
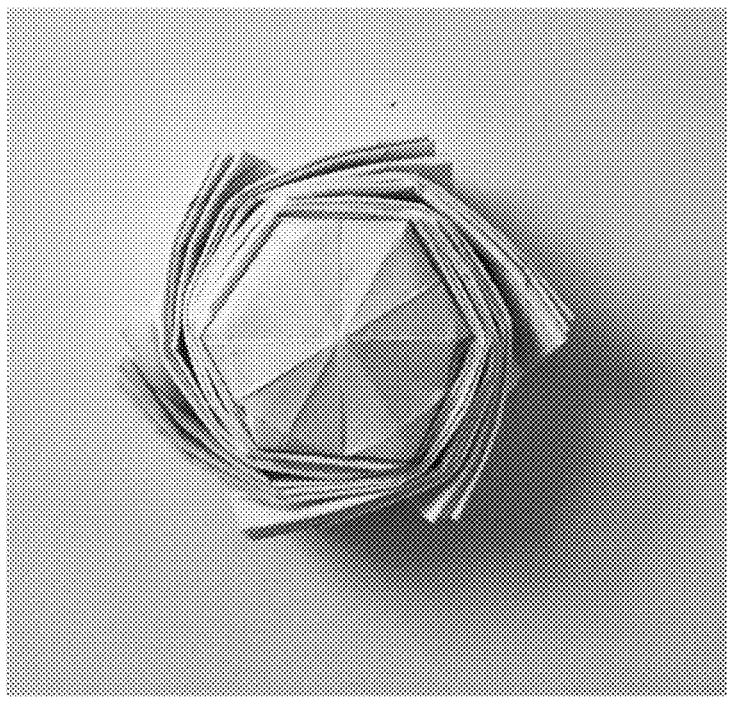
FIG. 16c is a top view of the 3D structure in FIG. 16b in a fully retracted stage.

FIG. 16b is a perspective view of an intermediary stage of a deployed 3D structure based on the 2D crease map in FIG. 16a with a hexagon top surface. FIG. 16c is a top view of the same structure in a completely retracted stage. As the number of edges of the top polygonal surface increase, it approaches a circle in shape.

FIGS. 1-17 illustrate central hubs in various shapes and sizes. A common feature, however, exist as sequences of pleating valleys and peaks that can deploy away from or retract toward a central hub. A rotational component, clock or counter clock wise, can be incorporated into the structure's transformation process. Such a design allows the area atop the central hub to remain relatively small, in comparison to a fully deployed one with a larger number of pleats. This feature ensures that when the structure is in a fully retracted position, it occupies much less space. When space limitation is of concern, solar arrays can be hosted via this type of templates, with panels retracted and protected when not in use.

A real world example can be appreciated in FIG. 16b, where surface area of surrounding peaks and valleys, in a semi deployed stage, is at least 10-15 times larger than that of the top surface of the hexagon central hub. FIG. 16c illustrates a top view of a fully retracted hexagon central hub with all of its pleats collapsed and wrapped around. Rotational component not only facilitates lateral retraction of the pleats, it allows the pleats to continuously wrap around the central hub from one vertex to the next, and therefore reduces the overall size even further. When fully retracted, an increase of overall size in comparison to the top surface of the central hub alone is roughly less than 30%. In sum, when the structure, or a template thereof, is fully deployed, it can encompass a relatively large surface area. When the structure is fully retracted, it can be reduced to occupy a much smaller area, only modestly larger or wider than the central hub itself.

A large ratio of transformation in surface area, on an order of magnitude between a fully deployed surface to a fully retracted one, is of particularly relevance for a structure that hosts solar arrays. When fully deployed, it ensures maximum surface area exposure for the arrays to convert solar radiation into electric energy. When fully retracted, it packs the array into a much smaller and protected space tightly around a central hub.

A flat solar panel must be oriented towards the sun. If the flat panel is stationary, such as the ones bolted onto the rooftop, electricity output inevitably changes as the sun moves across its surface over time. FIGS. 14*c* and *f* illustrate two square-hub structural templates in similar intermediary deployed stages, with sources of lighting coming from opposite directions. Light source in FIG. 14*c* emanates from upper left corner. Light source in FIG. 14*f* emanates from upper right corner. With pleating valleys and peaks surrounding the central hub in 360 degrees, overall surface areas in exposure and/or in shade are comparable in both configurations. This feature allows solar arrays hosted via the structure to be less dependent in terms of its orientation to the sun or to any source of radiation. Just like a real valley, a shaded slope on one side of the valley will be in the sun as the earth rotate around the sun over time. In comparison to flat bolted solar panels, this structure, taken as a whole unit, in essence provides an alternative as a non-flat solar array unit. Because the folds allow panels to be positioned 360 degrees around the hub in all directions of facing.

FIGS. 12*a-d* are perspective views of an exemplary deployable structure from a completely retracted configuration to a largely deployed one. By driving the structure back and forth, one can change the surface area of exposure. When the structure is hosting a plurality of solar arrays, a change in surface area of exposure is directly linked to its electricity output. The mechanical transformation process of the structure can be coupled with feedback loops to attenuate output of electricity from the solar arrays in a rather straightforward manner. If the output is below a preset threshold, a signal is generated and sent to instruct the structure to deploy more so as to increase surface exposure for the solar arrays. Conversely, if the output is too high and above a preset threshold, the structure can be instructed to retract so as to decrease surface exposure.

Solar cells or panels come in a variety of styles, subcomponents, and designs. Common silicon based photovoltaics are monocrystalline panels, polycrystalline panels, and thin-film solar cells. Carbon based organic photovoltaics are referred to as plastic solar cells or polymer solar cells. There are pros and cons associated with each one of them in terms of efficiency and cost. The structure disclosed in the present application does not impose any limitation on which type of solar panels or cells it can host. Sheet materials, such as fabric, metal, wood, plastic, nylon, and/or other materials, are all suitable because they can be easily tailored to provide an extended surface area with a certain amount of tension and support. The structure itself can be manufactured with a variety of material combinations (or composite materials) so long as it is strong enough to support the solar panels and cells as well as to maintain its own integrity during transformation.

Thin-film cells can be directly manufactured with a structural substrate comprising the design of the transformable template allowing for deployment or retraction. Rigid panels can be affixed, via various means of attachment, onto stronger templates of mesh or planked structure of various materials. Types of attachment may include but not limited to: hooks and loops, carabineers, clips, R-clips, spring clips, rings, pins, clevis pins, cotter pins, linchpins, buttons, buckles, grommets, adhesives, Velcro, and snap fastener with male/female part etc.

Given that solar panels or cells comprise a certain thickness and weight, the following examples illustrate several configurations taking into consideration of its overall size and collapsibility. Solar panels and cells can be hosted, via various means of attachment, on the top surface of the central hub and/or onto surfaces of the pleats or folds surrounding the hub thereof. Electric wiring and charging components can be configured onto the undersurface of the structure, along ridges of peaks and valleys, as well as into the inner cavity of the central hub. Different types of hinges or joints can also be employed to reinforce the structure as needed.

Figure 1:
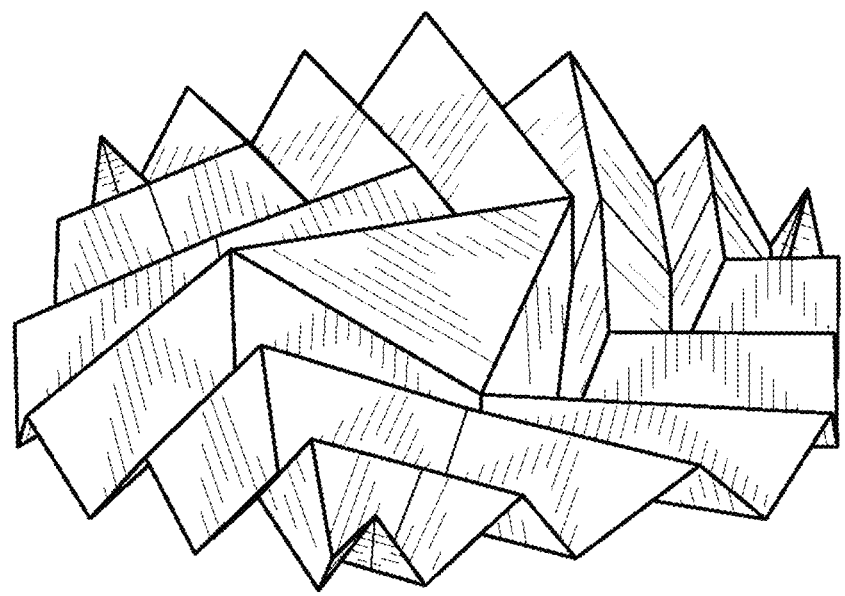
FIG. 1 is a perspective view of a deployable structure in a semi-deployed position.
Figure 2:
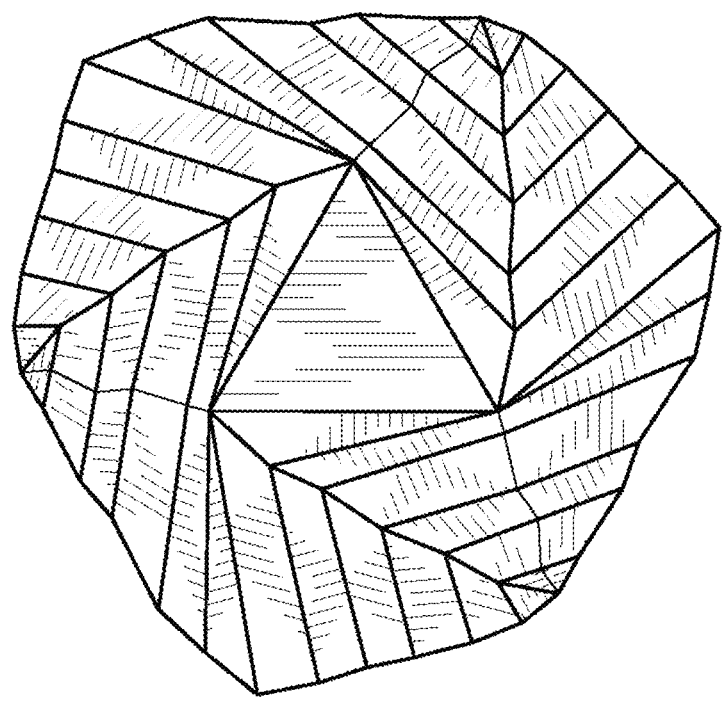
FIG. 2 is a top view thereof.
Figure 3:
FIG. 3 is a front view thereof.
Figure 4:
FIG. 4 is a back view thereof.
Figure 5:
FIG. 5 is a left view thereof.
Figure 6:
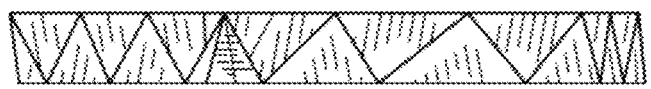
FIG. 6 is a right view thereof.
Figure 7:
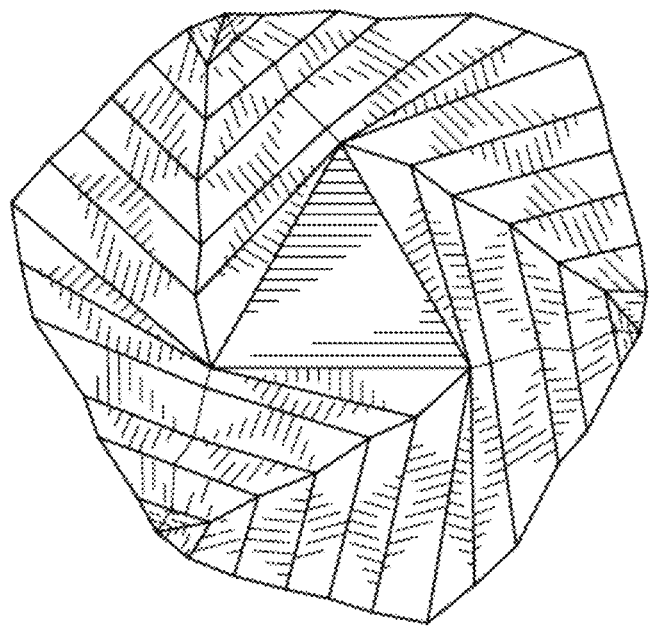
FIG. 7 is a bottom view thereof.
Figure 8A:
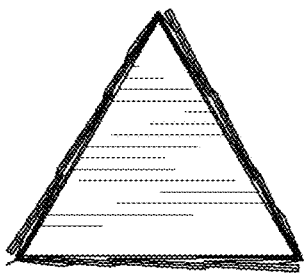
FIG. 8a is top view of the deployable structure with all panels retracted and folded tightly around a central hub.
Figure 8B:
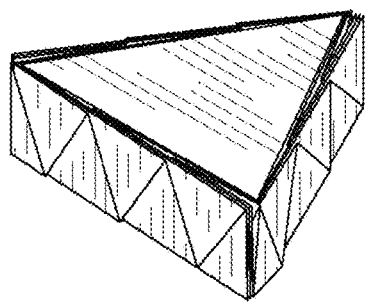
FIG. 8b is a perspective view thereof.
Figure 9A:
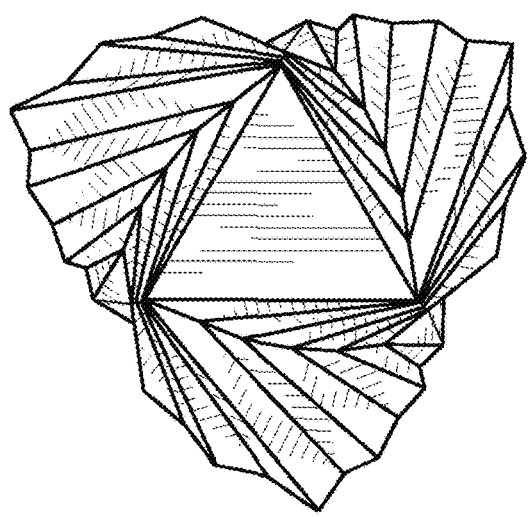
FIG. 9a is a top view of the deployable structure with all panels in a slightly deployed position.
Figure 9B:
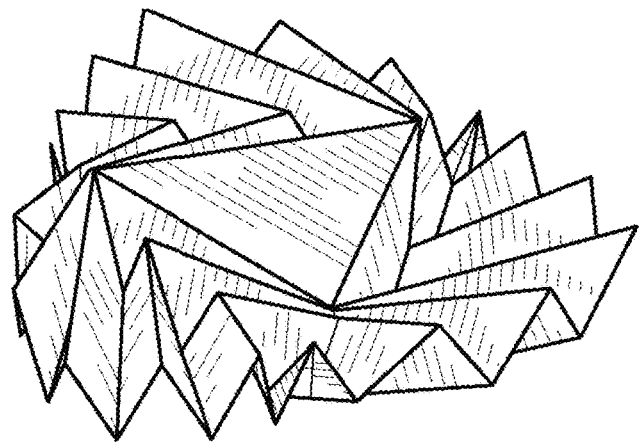
FIG. 9b is a perspective view thereof.
Figure 10A:
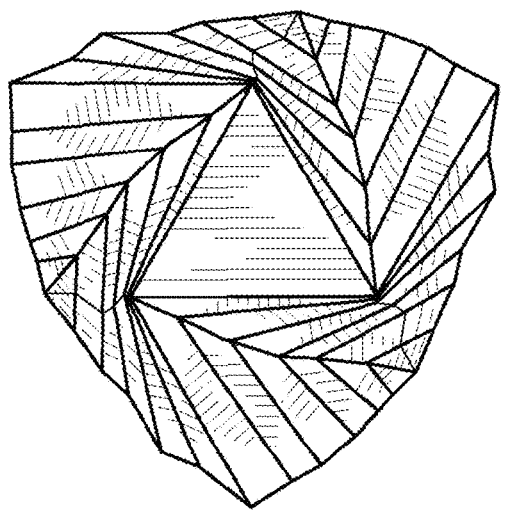
FIG. 10a is a top view of the deployable structure with all panels in a further deployed position.
Figure 10B:
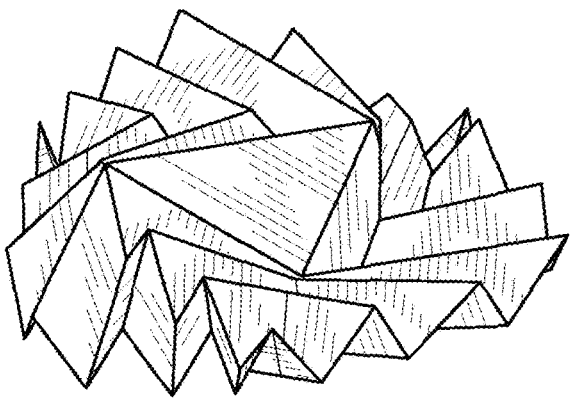
FIG. 10b is a perspective view thereof.
Figure 11A:
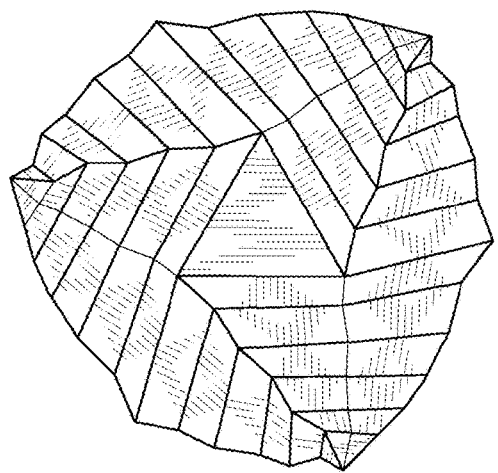
FIG. 11a is top view of the deployable structure with all panels in yet a further deployed position.
Figure 11B:
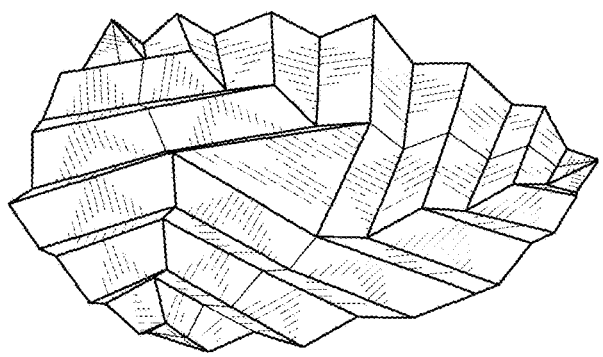
FIG. 11b is a perspective view thereof.
Figure 12A:
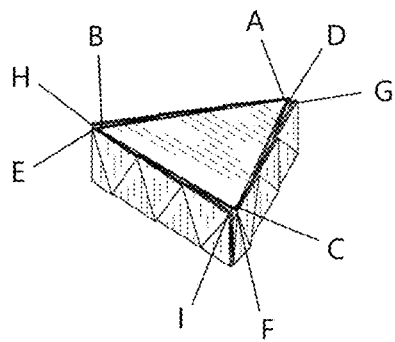
FIGS. 12a-d are perspective views of an exemplary deployable structure, with a triangular central hub ABC, in various stages of deployment/retraction. Letter labels of vertices are intended to help visualize a dynamic deploying/retracting process.
Figure 12B:
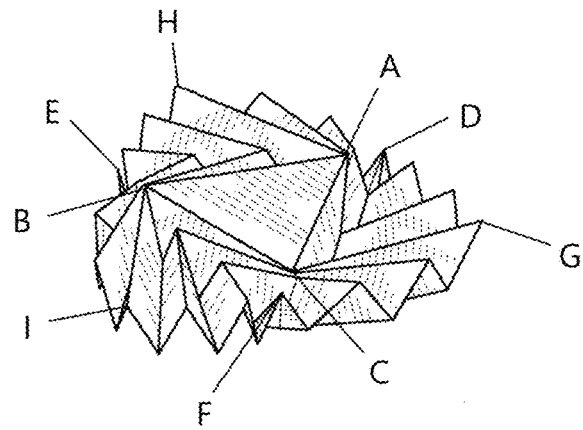
Figure 12C:
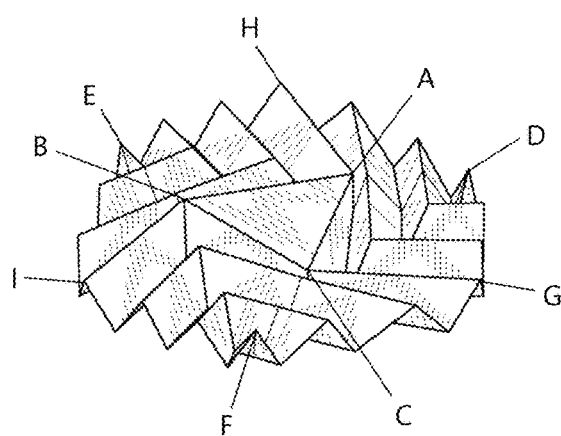
Figure 12D:
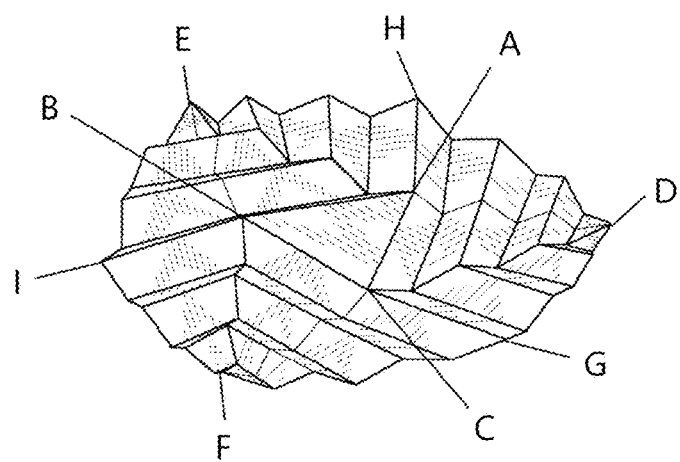
Figure 19:
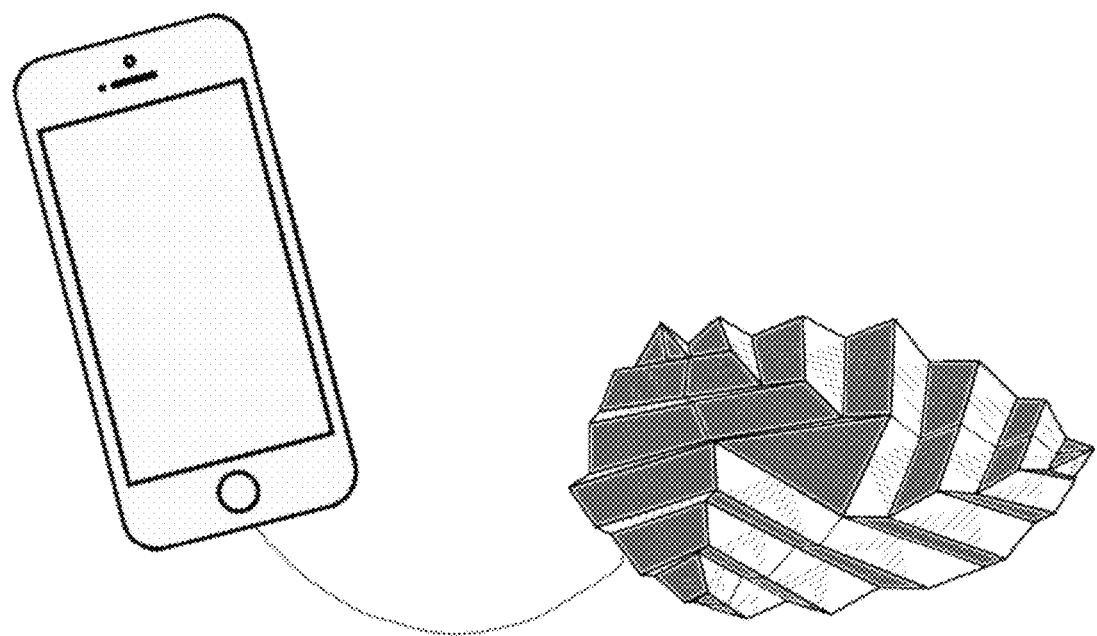
FIG. 19 illustrates an exemplary scaled down embodiment wherein solar panels are only hosted onto alternate valley or hill folds.
Figure 20:
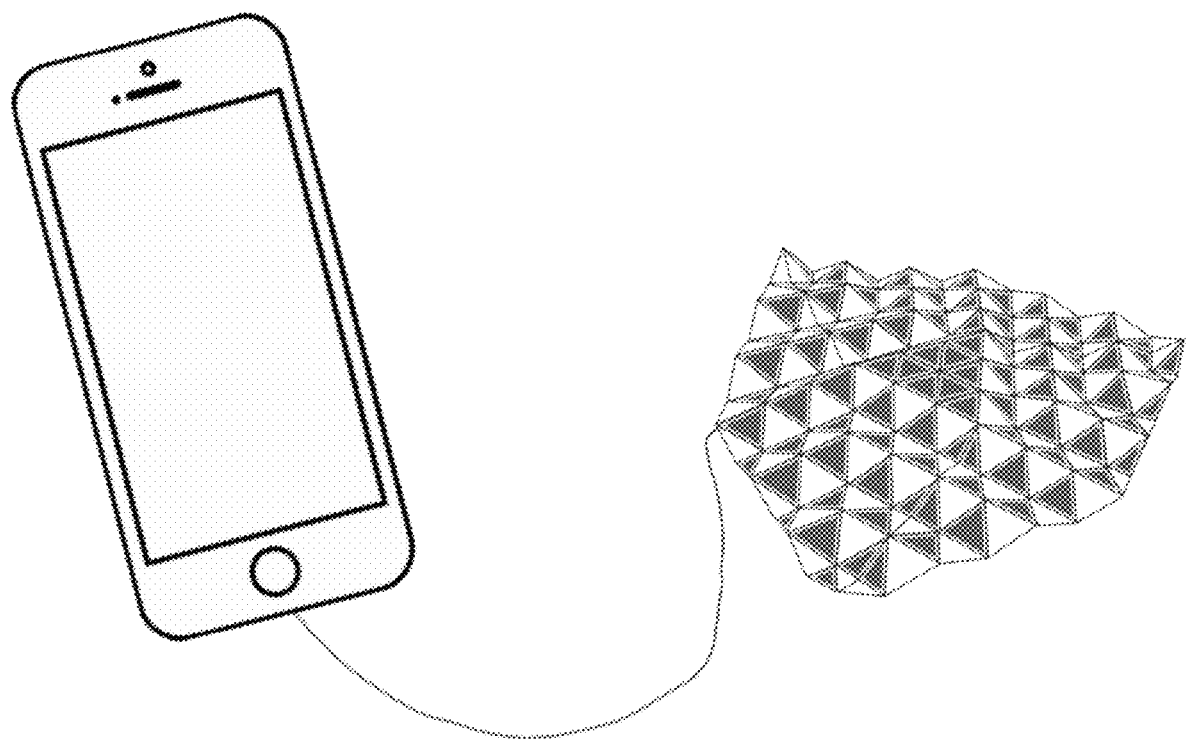
FIG. 20 illustrates an exemplary scaled down embodiments wherein solar panels are in triangular shapes and hosted in an alternating and complementary pattern between valley and hill folds.

FIG. 19 illustrates an exemplary scaled down embodiment wherein solar cells (shaded in dark gray) are only hosted onto alternate valley or hill folds. Collective electric output of the array is small enough to power a portable electronic device. The structure itself can be simply opened and closed by pulling and pushing the folds by hand. In a fully retracted position, such as illustrated in FIGS. 8*a* and *b*, the entire structure is small enough to fit in one's palm, in a small case, or in someone's carry bag. FIG. 20 illustrates another exemplary scaled down embodiments wherein solar cells are in triangular shapes and hosted in an alternating and complementary manner between valley and hill folds. In a fully retracted position, panels on the hill fold will fit into an empty slot flanked by panels on the corresponding valley fold, and vice versa. For a medium sized embodiment, as an example, a unit could be of a size suitable to transport on roof rack of a vehicle or in its trunk space, and to provide comparable charging output for a camping trip.

Given the continuity of surface area available along the surfaces of the folds, solar panels and cell can be tailored into single units as well as in clustered groups, taken into account of its folding pattern and thickness. There is no limitation of a particular shape or number that they must follow, so long as there is enough surface area on the folds for them to attach. Triangular cells in FIG. 20 can certainly be altered into square ones, or any other shape as desired for functionalities as well as for aesthetic appearances.

Figure 21:
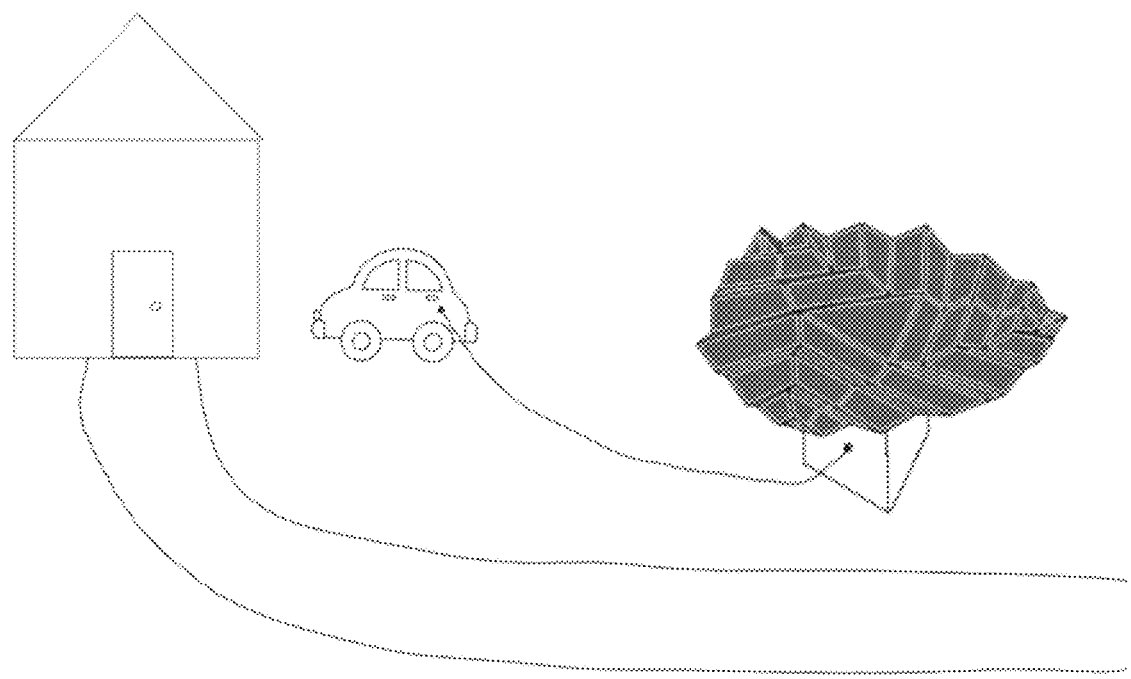
FIG. 21 illustrates an exemplary scaled up embodiment, wherein a collective electric output of solar panels is large enough to power a vehicle.

FIG. 21 illustrates an exemplary scaled up embodiment, wherein a collective electric output of solar panels is large enough to power a vehicle. For residential use, a unit can be secured atop a support stand or a charging station on the ground via its central hub. In a fully retracted position, it does not take up any more space than the support stand or the charging station itself, and all panels of the solar array are fully protected from the elements. One or more units can be fully deployed at will to provide power for the house or to the grid on a need basis. No roof installations are required. Since all units are stationed on the ground and easily accessible, maintenance can be performed discretely together with the rest of hardware, such as charging stations.

Figure 22:
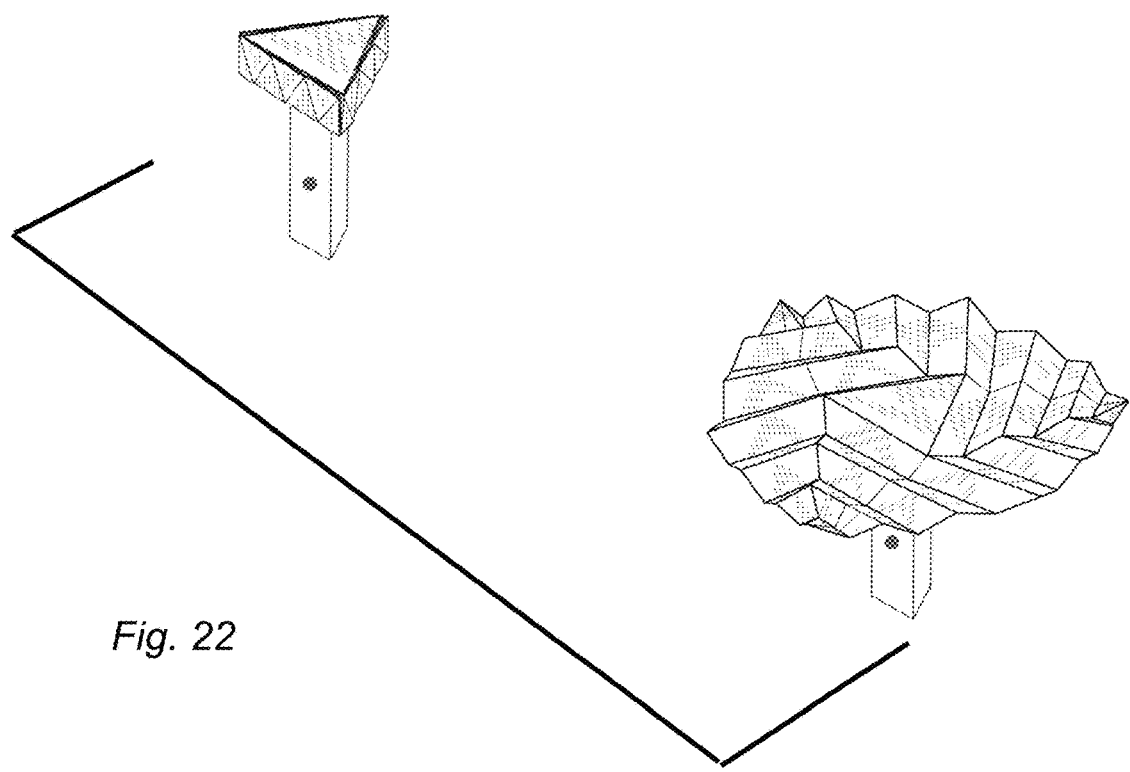
FIG. 22 illustrates a scaled up embodiment, wherein multiple units are present at a charging station.

FIG. 22 illustrate yet another scaled up embodiment, wherein multiple units are present at a charging station for bikes, scooters, or even cars. Each unit can be situated onto a support stand or a charging station via its central hub. Ones that are in use can be elevated and deployed. Ones that are not in use can be lowered and fully retracted.

Scaled up embodiments of the deployable structure inevitably requires more reinforcement in support and in strength both for sustaining weight of itself and for the objects hosted atop. Auxiliary mechanic, such as support beam, frames, tracks, may need to be installed in order to drive and to facilitate the transformation process of the structure hosting solar panels. Given the rigidity of the deployable structure, auxiliary mechanics can be easily coupled with undersides of the structure, such as with peak and valley ridges, as well as to the hinges designed to serve as peaks or valleys for the folds.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to achieve the desired features of the present disclosure. Also, a multitude of different constituent module names other than those depicted herein can be applied to the various partitions. Although the disclosure is described above in terms of various exemplary embodiments and implementations, it should be understood that the various features, aspects and functionality described in one or more of the individual embodiments are not limited in their applicability to the particular embodiments with which they are described, but instead can be applied, alone or in various combinations, to one or more of the other embodiments of the disclosure, whether or not such embodiments are described and whether or not such features are presented as being a part of a described embodiment. Thus the breadth and scope of the present disclosure should not be limited by any of the above-described exemplary embodiments. Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

What is claimed is:

1. A deployable structure for solar arrays comprising:
   a central hub with a polygonal top surface;
   a leading region and a trailing region configured around each vertex of the polygonal top surface, wherein the leading region comprises a first set of parallel folds intersecting at a preset angle with a corresponding second set of parallel folds in the trailing region;
   the first and the second set of parallel folds correspond to a plurality of generally continuous planar surfaces alternating between peaks and valleys in succession;
   a plurality of solar arrays detachably coupled to the polygonal top surface, and atop to the planar surfaces of the first and second set of parallel folds;
   wherein preset thresholds of electricity generated via the solar arrays are coupled with instructions to the deployable structure to transform in stages between a fully retracted configuration and a plurality of deployed configurations;
   in the fully retracted configuration, the first and second sets of parallel folds collapse onto one another, and further onto side surfaces of the central hub and
   in the plurality of deployed configurations, the first and second sets of parallel folds extend outward away from the central hub, and away from one another.

2. The deployable structure for solar arrays of claim 1, wherein the solar arrays comprise a plurality of photovoltaic cells tailored to be detachably coupled with the deployable structure at strategically preset locations along the planar surfaces of the first and second sets of parallel folds.

3. The deployable structure for solar arrays of claim 1, wherein the central hub further houses electronic components within its cavity.

4. The deployable structure for solar arrays of claim 1, wherein the first and second sets of parallel folds and the central hub are affixed to a support stand, and/or atop a charging station.

5. The deployable structure for solar arrays of claim 1, wherein the solar arrays comprise a plurality of attachment mechanisms configured to detachably couple with the deployable structure.

6. The deployable structure for solar arrays of claim 1, wherein the deployable structure comprises a plurality of attachment mechanisms configured to detachably couple with the solar arrays.

7. The deployable structure for solar arrays of claim 1, wherein the first and the second set of parallel folds are connected at their intersections and correspond to a plurality of generally continuous planar surfaces, with preset spacings, alternating between peaks and valleys in succession.

8. The deployable structure for solar arrays of claim 1, wherein the first and second set of parallel folds in the leading and trailing regions around one vertex is connected to those around a subsequent vertex of the top polygonal surface.

9. The deployable structure for solar arrays of claim 1, wherein the first and second set of parallel folds in the leading and trailing regions around one vertex is configured to be independent from those around other vertices of the top polygonal surface.

10. The deployable structure for solar arrays of claim 1, wherein the transformation stages among a retracted and a plurality of deployed configurations are driven via translational forces generally along a radius of the central hub, or via centrifugal forces around a center of the central hub, and/or a combination thereof.

11. The deployable structure for solar arrays of claim 1, wherein the first and second sets of parallel folds and the central hub comprise a composite material.

12. The deployable structure for solar arrays of claim 1, wherein the first set of parallel folds in the leading region are parallel to a first side of the polygonal top surface around its corresponding vertex, and the second set of parallel folds in the trailing region are parallel to a subsequent side of the polygonal top surface around said vertex.

\* \* \* \* \*